US011119822B2

(12) United States Patent
Nejad et al.

(10) Patent No.: US 11,119,822 B2
(45) Date of Patent: Sep. 14, 2021

(54) LINKAGE OF FIRED JOBS WITH INTERRELATED ACTIONS

(71) Applicant: Bank of America Corporation, Charlotte, NC (US)

(72) Inventors: Mohammad Nejad, Dallas, TX (US); Rudolph D. Hoffman, Dallas, TX (US); Nadeem Panjwani, Dallas, TX (US); Paul Eric Hazboun, Flower Mound, UT (US)

(73) Assignee: Bank of America Corporation, Charlotte, NC (US)

( * ) Notice: Subject to any disclaimer, the term of this patent is extended or adjusted under 35 U.S.C. 154(b) by 140 days.

(21) Appl. No.: 16/702,142

(22) Filed: Dec. 3, 2019

(65) Prior Publication Data

US 2021/0165683 A1    Jun. 3, 2021

(51) Int. Cl.
*G06F 9/46* (2006.01)
*G06F 9/48* (2006.01)

(52) U.S. Cl.
CPC ............ *G06F 9/4881* (2013.01); *G06F 9/485* (2013.01)

(58) Field of Classification Search
CPC .................................. G06F 9/4881; G06F 9/485
See application file for complete search history.

(56) References Cited

U.S. PATENT DOCUMENTS

| 6,985,922 B1* | 1/2006 | Bashen ................... G06Q 10/10 707/999.01 |
| 7,007,067 B1* | 2/2006 | Azvine .................... G06F 3/011 709/202 |
| 9,526,946 B1* | 12/2016 | Zets ...................... A61B 5/6892 |
| 2006/0136625 A1* | 6/2006 | Kao ........................ G06Q 20/127 710/67 |
| 2008/0109396 A1* | 5/2008 | Kacin .................... G06F 16/954 |
| 2017/0178121 A1* | 6/2017 | Roberts .............. G06Q 20/3676 |

* cited by examiner

*Primary Examiner* — Camquy Truong
(74) *Attorney, Agent, or Firm* — Weiss & Arons LLP; Michael A. Springs, Esq.

(57) ABSTRACT

Apparatus and methods may include a method for enabling customized jobs deployment in Autosys TM, reviewing of deployment results of said jobs in Autosys TM, and querying said deployment results. The method may include providing a verification of the deployment in a staging area. The staging area may be configured for arranging and deploying a plurality of job scripts in Autosys TM. Each job script may be interrelated with one or more other job scripts. The method may include visually indicating, in a status line, whether the job script has been deployed in Autosys TM or is set to be deployed to Autosys TM. The method may include further visually indicating in what way the job script is interrelated with one or more other job scripts. The method may include importing selected contents of a log folder from Autosys TM.

22 Claims, 22 Drawing Sheets

CREATE A SCRIPT TO POPULATE METADATA TABLES

```
DECLARE
    JPARAM APP_UTIL.AUTOSYS_UTILITY_PKG.JOB_PARAMS;
    ERRORMSG VARCHAR2(4000);
    CNT      NUMBER := 0;
    MRG_ERROR EXCEPTION;
BEGIN
    APP_UTIL.APP_UTILITY_PKG.ENABLE_DBMS_OUTPUT;
    JPARAM.ACTN_NM            := 'INS';
    JPARAM.PARAM_TYPE         := 'CMD';
    JPARAM.JOB_NM             := 'LMD3_HL_CTR_DM_BZ_F_DAILY_LOAN_ARCHIVE_WK';
    JPARAM.JOB_BOX_NM         := 'LMD3_DSDM_F_DAILY_LOAN_WEEKLY_MAINTENANCE_BOX_WK';
    JPARAM.JOB_TYP_NM         := 'SQL';
    JPARAM.FILE_NM            := 'call_f_daily_loan_archive.sql';
    JPARAM.SCCS_EML_TO_TX     := 'DSDM_Success_EmailTo';
    JPARAM.FAIL_EML_TO_TX     := 'DSDM_Failure_EmailTo';
    JPARAM.PKG_SUB_FLDR_NM    := 'SpecialtyServicing';
    JPARAM.DT_COND_TX         := '0';
    JPARAM.COND_TX            := 's(LMD3_MASTER_MAINTENANCE_HOLD)';
    JPARAM.JOB_DE             := 'Archive data older than 7 months(220 days)';
    JPARAM.OWNR_NM            := 'ZS0F8lO@corp';
    JPARAM.ALRM_IF_FAIL_FL:   := '1';
    JPARAM.BAT_FILE_NM        := 'CODM_AUTOSYS_SQL_MSTR';
    JPARAM.JOB_SQL_SRC_NM := q'[
DECLARE
    PI_COMMIT_FLAG VARCHAR2(100) :='Y';
    PO_SUCCESS_FLAG VARCHAR2(100);
    PO_RETURN_CODE VARCHAR2(100);
    PO_RETURN_MESSAGE VARCHAR2(100);
    v_Count           NUMBER:=0;
BEGIN
    HL_STG.GG_LND_TO_STAGE_DYNAMIC_PKG.ENABLE_DBMS_OUTPUT;
    HL_STG.GG_LND_TO_STAGE_DYNAMIC_PKG.REP_MDX_TO_STG('REP_STG_QM_IRRITANTS',1,PI_COMMIT_FLAG,PO_S
UCCESS_FLAG,PO_RETURN_CODE,PO_RETURN_MESSAGE);
END;
]';
```

FIG. 3A

```
JPARAM.PROJECT_CD         := NULL;
AUTOSYS_UTILITY_PKG.MERGE_JOB_INFO(JPARAM,ERRORMSG);   ⎫ 302

IF ERRORMSG IS NOT NULL THEN
    RAISE MRG_ERROR;
    END IF;
commit;

EXCEPTION
WHEN MRG_ERROR THEN
    DBMS_OUTPUT.PUT_LINE('MERGE ERROR: '|| ERRORMSG);
    RAISE;
WHEN OTHERS THEN
    DBMS_OUTPUT.PUT_LINE(SUBSTR (SQLERRM, INSTR (SQLERRM, ':')));
    RAISE;
END;
/
```

FIG. 3B

DEPLOY THE SCRIPT AND VERIFY THE DATA
(APP_UTIL.AUTOSYS_BOXES, APP_UTIL.AUTOSYS_JOBS tables)

402

| JOB_NM | SCCS_EML_TO_TX | FAIL_EML_TO_TX | STRT_DY_NM |
|---|---|---|---|
| LMD3_HL_CTR_DM_UPDT_FALSWRKFDLY_DASSOC_DY | DSDM_Success_EmailTo | DSDM_Failure_EmailTo | sa,su |
| LMD3_HL_CTR_DM_BZ_F_DAILY_LOAN_ARCHIVE_WK | DSDM_Success_EmailTo | DSDM_Failure_EmailTo | |
| LMD3_HL_BI_SP_RPT_LMPLAN_AGE_DY | DSDM_Success_EmailTo | DSDM_Failure_EmailTo | mo,tu,we,th,fr,sa |
| LMD3_HL_CTR_DM_BZ_GATHER_STATS_F_DAILY_LOAN_WK | DSDM_Success_EmailTo | DSDM_Failure_EmailTo | |
| LMD3_HL_CTR_DM_F_CASE_LOAN_DELETE_FLAG_UPDATE_DY | DSDM_Success_EmailTo | DSDM_Failure_EmailTo | all |
| LMD3_HL_CTR_DM_BZ_PARTITION_MAINTENANCE_WK | DSDM_Success_EmailTo | DSDM_Failure_EmailTo | sa |
| LMD3_HL_CTR_DM_F_CALL_DETAIL_ARCHIVE_WK | DSDM_Success_EmailTo | DSDM_Failure_EmailTo | sa |
| LMD3_HL_CTR_DM_F_CALL_DETAIL_DISABLE_IDX_DLY_WK | DSDM_Success_EmailTo | DSDM_Failure_EmailTo | sa |
| LMD3_HL_CTR_DM_F_CALL_DETAIL_REBUILD_IDX_DLY_WK | DSDM_Success_EmailTo | DSDM_Failure_EmailTo | sa |
| LMD3_HL_CTR_DM_LOAN_ACTIVITY_ARCHIVE_WK | DSDM_Success_EmailTo | DSDM_Failure_EmailTo | sa |
| LMD3_HL_BI_GATHER_STATS_RPT_F_LOAN_ACTIVITY_WK | DSDM_Success_EmailTo | DSDM_Failure_EmailTo | sa |
| LMD3_HL_CTR_DM_SP_ETL_ERR_CTL_SUMMARY_WK | DSDM_Success_EmailTo | DSDM_Failure_EmailTo | sa |
| LMD3_HL_CTR_DM_F_ALS_WORKFLOW_DLY_COUNT_CHECK_DY | DSDM_Success_EmailTo | DSDM_Failure_EmailTo | mo,tu,we,th,fr |

404

| STRT_TM | STS_TX | BAT_FILE_NM | JOB_ACTN_NM |
|---|---|---|---|
| 8:00 | COMPLETE | CODM_AUTOSYS_SQL_MSTR | INS |
| | COMPLETE | CODM_AUTOSYS_SQL_MSTR | INS |
| 7:35 | COMPLETE | CODM_AUTOSYS_SQL_MSTR | INS |
| | COMPLETE | CODM_AUTOSYS_SQL_MSTR | INS |
| 18:00 | COMPLETE | CODM_AUTOSYS_SQL_MSTR | INS |
| 10:00 | COMPLETE | CODM_AUTOSYS_SQL_MSTR | INS |
| 22:00 | COMPLETE | CODM_AUTOSYS_SQL_MSTR | INS |
| 3:00 | COMPLETE | CODM_AUTOSYS_SQL_MSTR | INS |
| 7:30 | COMPLETE | CODM_AUTOSYS_SQL_MSTR | INS |
| 22:00 | COMPLETE | CODM_AUTOSYS_SQL_MSTR | INS |
| 21:00 | COMPLETE | CODM_AUTOSYS_SQL_MSTR | INS |
| 21:00 | COMPLETE | CODM_AUTOSYS_SQL_MSTR | INS |
| 22:00 | COMPLETE | CODM_AUTOSYS_SQL_MSTR | INS |
| 8:00 | COMPLETE | CODM_AUTOSYS_SQL_MSTR | INS |

FIG. 4

SAMPLE LOG FILE CONTENT
(LMD3_HL_CTR_DM_F_ALS_WORKFLOW_DLY_COUNT_CHECK_DY.log)

```
lxp server = l1twe0f1papd1
There were no errors, processing the jil file.

CAUAJM_I_50323 Inserting/Updating job: LMD3_HL_CTR_DM_F_ALS_WORKFLOW_DLY_COUNT_CHECK_DY
CAUAJM_I_10122 Job 'LMD3_HL_CTR_DM_F_ALS_WORKFLOW_DLY_COUNT_CHECK_DY' scheduled:
04/20/2017 09:00:00
CAUAJM_I_50205 Database change WAS Successful!

CAUAJM_I_52301 Exit Code = 0
```

FIG. 5

SAMPLE JIL FILE CONTENT
(LMD3_HL_CTR_DM_UPDT_FALSWRKDLY_DASSOC_DY.jil_20170417)

```
/* ----------- LMD3_HL_CTR_DM_UDT_FALSWRKDLY_DASSOC_DY> ----------- */ insert_job: LMD3_HL_CTR_DM_UDT_FALSWRKDLY_DASSOC_DY   job_type: CMD
command: d :/Autosys_Batch/CODM_AUTOSYS_SQL_MSTR.BAT .PASSWD_RPTCTRM_CTRDMS0 %AUTO_JOB_NAME% DC
DSDM_Success_EmailTo DSDM_Failure_EmailTo
box_name: LMD3_CM_DAILY_LOAD_CATCHUP_BOX_DY
machine: wcdre21epdbd1.bankofamerica.com
owner: ZS0F8L0@corp
date_conditions: 1
days_of_week: sa, su
start_times: "8:00"
condition: s(LMD3_MASTER_MAINTENANCE_HOLD)
description: "Post Update on HL_CTR_DM.F_ALS_WORKFLOW_DLY table with D_ASSOCIATE data"
std_out_file: "d:/Autosys_Batch/AutosysLogs/%AUTO_JOB_NAME%.%AUTORUN%.%AUTOPID%.out"
std_err_file: "d:/Autosys_Batch/AutosysLogs/%AUTO_JOB_NAME%.%AUTORUN%.%AUTOPID%.err"
alarm_if_fail: 1
timezone: US/Central
```

FIG. 6

UPDATE job script

```
DECLARE
  JPARAM APP_UTIL.AUTOSYS_UTILITY_PKG.JOB_PARAMS;
  ERRORMSG VARCHAR2(4000);
  CNT       NUMBER := 0;
  MRG_ERROR EXCEPTION;
BEGIN
  APP_UTIL.APP_UTILITY_PKG.ENABLE_DBMS_OUTPUT;                              702
  JPARAM.ACTN_NM            := 'UPD';
  JPARAM.PARAM_TYPE         := 'CMD';
  JPARAM.JOB_NM             := 'LMD3_HL_CTR_DM_BZ_F_DAILY_LOAN_ARCHIVE_WK';
  JPARAM.JOB_BOX_NM         := 'LMD3_DSDM_F_DAILY_LOAN_WEEKLY_MAINTENANCE_BOX_WK';
  JPARAM.JOB_TYP_NM         := 'SQL';
  JPARAM.FILE_NM            := 'call_f_daily_loan_archive.sql';
  JPARAM.SCCS_EML_TO_TX     := 'DSDM_Success_EmailTo';
  JPARAM.FAIL_EML_TO_TX     := 'DSDM_Failure_EmailTo';
  JPARAM.PKG_SUB_FLDR_NM    := 'SpecialtyServicing';
  JPARAM.DT_COND_TX         := '0';
  JPARAM.COND_TX            := 's(LMD3_MASTER_MAINTENANCE_HOLD) ';
  JPARAM.JOB_DE             := 'Archive data older than 7 months(220 days)';
  JPARAM.OWNR_NM            := 'ZS0F8LO@corp';
  JPARAM.ALRM_IF_FAIL_FL    := '1';
  JPARAM.BAT_FILE_NM        := 'CODM_AUTOSYS_SQL_MSTR';
  JPARAM.JOB_SQL_SRC_NM     := q'[
DECLARE
  PI_COMMIT_FLAG VARCHAR2(100) :='Y';
  PO_SUCCESS_FLAG VARCHAR2(100);
  PO_RETURN_CODE VARCHAR2(100);
  PO_RETURN_MESSAGE VARCHAR2(100);
  v_Count NUMBER:=0;
BEGIN
  HL_STG.GG_LND_TO_STAGE_DYNAMIC_PKG.ENABLE_DBMS_OUTPUT;
  HL_STG.GG_LND_TO_STAGE_DYNAMIC_PKG.REP_MDX_TO_STG('REP_STG_QM_IRRITANTS',1,PI_COMMIT_FLAG,PO_SUCCESS_FLAG,PO_RETURN_CODE,PO_RETURN_MESSAGE);
END;
]';
```

FIG. 7A

```
JPARAM.PROJECT_CD         := NULL;
AUTOSYS_UTILITY_PKG.MERGE_JOB_INFO(JPARAM,ERRORMSG);  ─── 704

IF ERRORMSG IS NOT NULL THEN
    RAISE MRG_ERROR;
    END IF;
commit;

EXCEPTION
    WHEN MRG_ERROR THEN
        DBMS_OUTPUT.PUT_LINE('MERGE ERROR: '|| ERRORMSG);
    RAISE;
    WHEN OTHERS THEN
        DBMS_OUTPUT.PUT_LINE(SUBSTR(SQLERRM, INSTR(SQLERRM, ':')));
    RAISE;
END;
/
```

FIG. 7B

| Parameter Name in Script | Parameter Name in JIL File | Description |
|---|---|---|
| ACTN_NM | | There are three main functionalities this framework provides and its action name should be labeled according to the action needed (case sensitive):<br>• INS: Insert<br>• UPD: Update<br>• DEL: Delete |
| PARAM_TYPE | JOB_TYPE | There are two parameters types:<br>• CMD<br>• BOX |
| JOB_NM | INSERT_JOB<br>UPDATE_JOB<br>DELETE_JOB | The name of the job with appropriate naming convention |
| JOB_BOX_NM | BOX_NAME | The name of the box with appropriate naming convention |
| JOB_TYP_NM | | Consists of the following three options based on the BAT file:<br>• SQL<br>• SSIS<br>• PROC |
| FILE_NM | COMMAND Property | Similar to the command line in the JIL file, insert the file name, if any |
| SCCS_EML_TO_TX | COMMAND Property | Similar to the command line in the JIL file, insert the Success_Email_To, if any |
| FAIL_EML_TO_TX | COMMAND Property | Similar to the command line in the JIL file, insert the Failure_Email_To, if any |
| PKG_SUB_FLDR_NM | COMMAND Property | Similar to the command line in the JIL file, insert the package subfolder name, if any |
| PROC_NM | COMMAND Property | Similar to the command line in the JIL file, provide the <PROCNAME>, if any |
| MRG_DY_CT | COMMAND Property | Similar to the command line in the JIL file, provide the <MERGEDAYS>, if any |

FIG. 8A

| STRT_DY_NM | DAYS_OF_WEEK | The exact days a specified job should be scheduled to run |
|---|---|---|
| STRT_TM | START_TIMES | The exact time a specified job should run (24-hour military time format)<br>• NOTE: Cannot be used in combination with STRT_MINS |
| STRT_MINS | START_MINS | The exact minutes after each hour the specified job should run<br>• NOTE: Cannot be used in combination with STRT_TM |
| COND_TX | CONDITION | Describe the dependencies, such as the success of another job |
| JOB_DE | DESCRIPTION | Description of the job |
| BAT_FILE_NM | | BAT file name that will be used by this job, specifically listed in the AUTOSYS_FILE_TEMPLATE table under BAT_FILE_NM |
| JOB_SQL_SRC_NM | | Provide the contents of the SQL file name, if any |
| DT_COND_TX | DATE_CONDITIONS | If selected "1", this job will run on the selected schedule provided by STRT_DY_NM, STRT_TM, or STRT_MINS |
| PRMSN_TX | PERMISSION | Type of permissions given to specific groups |
| OWNR_NM | OWNER | Owner of the job |
| ALRM_IF_FAIL_FL | ALARM_IF_FAIL | Generates an alarm if the job fails |
| ALRM_IF_TERM_FL | ALARM_IF_TERMINATED | Generates an alarm if the job terminated |
| MAX_RUN_ALRM | MAX_RUN_ALARM | If the job runs for more than the specified minutes, it will generate an alarm |
| TERM_RUN_TM | TERM_RUN_TIME | The job will terminate if it runs past the specified minutes |
| RUN_CALENDAR_TX | RUN_CALENDAR | specify a custom calendar to Schedule a Job to Run on Specific Dates |
| PROFILE_TX | PROFILE | Specifies a profile that defines the non-system environment variables for the job |
| JOB_LOAD_TX | JOB_LOAD | defines the relative amount of processing power the job consumes |
| PRIORITY_TX | PRIORITY | Specifies queuing priority of all jobs queued for a given machine |

FIG. 8B

| | | |
|---|---|---|
| RESOURCES_TX | RESOURCES | Specifies resources that job will use |
| AUTO_DELETE_CT | AUTO_DELETE | Number of hours the job definition should be automatically deleted after successful completion. |
| RUN_WINDOW_TX | RUN_WINDOW | Time intervals that job will run |
| RETRY_CT | N_RETRYS | Number of retries on a failure |
| PNAME_1_TX | | SQL scripts parameter name 1 |
| PVALUE_1_TX | | SQL scripts parameter value 1 |
| PNAME_2_TX | | SQL scripts parameter name 2 |
| PVALUE_2_TX | | SQL scripts parameter value 2 |
| PNAME_3_TX | | SQL scripts parameter name 3 |
| PVALUE_3_TX | | SQL scripts parameter value 3 |
| PNAME_4_TX | | SQL scripts parameter name 4 |
| PVALUE_4_TX | | SQL scripts parameter value 4 |
| PNAME_5_TX | | SQL scripts parameter name 5 |
| PVALUE_5_TX | | SQL scripts parameter value 5 |
| TRGT_SCHM_NM: Target Schema Name | | Target schema name |
| TRGT_TBL_NM: Target Table Name | | Target table name |
| PRCS_TYP_NM: Process Type Name | | The type of process that job is doing. For examples INSERT, MERGE, GATHERSTATS |
| PROJECT_CD | | Used to group jobs based on projects or teams. |
| STS_TX | | Different stages of job status:<br>• INITIATE: Currently not in Autosys<br>• LOCK: Does not allow Autosys to run this job<br>• COMPLETE: Job has been successfully added to Autosys<br>• FAILED: Job has failed to be inserted or updated in Autosys |

FIG. 8C

```
/* ---------- LMD3_DSDM_DCN_ONESOURCE_LND_DNCCONTRACT_HR ---------- */ insert_job: LMD3_DSDM_DCN_ONESOURCE_LND_DNCCONTRACT_HR    job_type: CMD
box_name: LMD3_DSDM_DCN_ONESOURCE_LND_BOX_HR
command: d /:/Autosys_Batch/CODM_AUTOSYS_SSIS_MSTR.bat "DCN_OneSource_CODM_DCNCONTACT" %AUTO_JOB_NAME% DC
machine: wsiye03i.siy-p01.chp.bankofamerica.com
owner: ZS0F8L0@corp
date_conditions: 0
conditions success (LMD3_MASTER_MAINTENANCE_HOLD)
description: "This Job executes an SSIS Package to load table HL_DCNLND.DNCCONTACT"
std_out_file: "d:/Autosys_Batch/AutosysLogs/%AUTO_JOB_NAME%.%AUTORUN%.%AUTOPID%.out"
std_err_file: "d:/Autosys_Batch/AutosysLogs/%AUTO_JOB_NAME%.%AUTORUN%.%AUTOPID%.err"
alarm_if_fail: 1
timezone: US/Central
```

FIG. 9

```
BEGIN
APP_UTIL.APP_UTILITY_PKG.ENABLE_DBMS_OUTPUT;
  JPARAM.ACTN_NM           := 'INS';
  JPARAM.PARAM_TYPE        := 'BOX';
  JPARAM.JOB_NM            := 'LMD3_DSDM_F_DAILY_LOAN_WEEKLY_MAINTENANCE_BOX_WK';
  JPARAM.JOB_BOX_NM        := NULL;
  JPARAM.DT_COND_TX        := '1';
  JPARAM.STRT_DY_NM        := 'sa';
  JPARAM.STRT_TM           := '20:00';
  JPARAM.STRT_MINS         := NULL;
  JPARAM.COND_TX           := 's(LMD3_MASTER_MAINTENANCE_HOLD)';
  JPARAM.JOB_DE            := 'This set up runs archiving and table stats on
HL_CTR_DM_BZ.F_DAILY_LOAN';
  JPARAM.PRMSN_TX          := NULL;
  JPARAM.OWNR_NM           := 'ZS0F8LO@corp';
  JPARAM.ALRM_IF_FAIL_FL   := '1';
  JPARAM.TERM_RUN_TM       := NULL;
  JPARAM.PROJECT_CD        := NULL;
  JPARAM.STS_TX            := NULL;
```

FIG. 10

```
SET DEFINE OFF
SET ECHO OFF;
SET SERVEROUTPUT ON;
SET LINESIZE 1000;

ALTER SESSION SET CURRENT_SCHEMA = APP_UTIL;

DECLARE
    JPARAM APP_UTIL.AUTOSYS_UTILITY_PKG.JOB_PARAMS;
    ERRORMSG VARCHAR2(4000);
    CNT            NUMBER := 0;
      MRG_ERROR    EXCEPTION;
BEGIN
    APP_UTIL.APP_UTILITY_PKG.ENABLE_DBMS_OUTPUT;
    JPARAM.ACTN_NM         := 'INS';
    JPARAM.PARAM_TYPE      := 'BOX';
    JPARAM.JOB_NM          := 'TEST_GUIDELINE_GRAMEWORK';
    JPARAM.JOB_BOX_NM      := NULL;
    JPARAM.JOB_TYP_NM      := NULL;
    JPARAM.FILE_NM         := NULL;
    JPARAM.SCCS_EML_TO_TX  := NULL;
    JPARAM.FAIL_EML_TO_TX  := NULL;
    JPARAM.PKG_SUB_FLDR_NM:= NULL;
    JPARAM.STRT_DAY_NM     := NULL;
    JPARAM.STRT_MINS       := NULL;
    JPARAM.COND_TX         := NULL;
```

Script Output

```
*** get_Target_Obj_Detail_ID ***
Add autosys job info for TEST_GUIDELINE_FRAMEWORK
*** log_activity (2) ***
PL/SQL procedure successfully completed
```

```
SELECT BOX_NM, STS_TX FROM APP_UTIL.AUTOSYS_BOXES
WHERE BOX_NM = 'TEST_GUIDELINE_FRAMEWORK';
```

| DATA GRID | |
|---|---|
| BOX_NM | STS_TX |
| TEST_GUIDELINE_FRAMEWORK | (INITIATE) ~1202 |

FIG. 12

```
SELECT * FROM APP_UTIL.ACTIVITY_AUDIT_LOG L
WHERE L.TARGET_TABLE_NAME LIKE 'AUTOSYS%'
ORDER BY 1 DESC;
```

FIG. 13

```
BEGIN
  APP_UTIL.APP_UTILITY_PKG.ENABLE_DBMS_OUTPUT;
    JPARAM.ACTN_NM           := 'INS';
    JPARAM.PARAM_TYPE        := 'CMD';
1402─ JPARAM.JOB_NM            := 'LMD3_HL_CTR_DM_BZ_F_DAILY_LOAN_ARCHIVE_WK';
1404─ JPARAM.JOB_BOX_NM        := 'LMD3_DSDM_F_DAILY_LOAN_WEEKLY_MAINTENANCE_BOX_WK';
    JPARAM.JOB_TYP_NM        := 'SQL';
    JPARAM.FILE_NM           := 'call_f_daily_loan_archive.sql';
    JPARAM.SCCS_EML_TO_TX    := 'DSDM_Success_EmailTo';
    JPARAM.FAIL_EML_TO_TX    := 'DSDM_Failure_EmailTo';
    JPARAM.PKG_SUB_FLDR_NM   := 'SpecialtyServicing';
    JPARAM.DT_COND_TX        := '0';
    JPARAM.STRT_DY_NM        := NULL;
    JPARAM.STRT_TM           := NULL;
    JPARAM.STRT_MINS         := NULL;
    JPARAM.COND_TX           := 's(LMD3_MASTER_MAINTENANCE_HOLD)';
    JPARAM.JOB_DE            := 'Archive data older than 7 months(220 days)';
    JPARAM.PRMSN_TX          := NULL;
    JPARAM.OWNR_NM           := 'ZS0F8LO@corp';
    JPARAM.ALRM_IF_FAIL_FL   := '1';
    JPARAM.MAX_RUN_ALRM      := NULL;
    JPARAM.TERM_RUN_TM       := NULL;
    JPARAM.RETRY_CT          := NULL;
    JPARAM.PROC_NM           := NULL;
    JPARAM.MRG_DY_CT         := NULL;
    JPARAM.BAT_FILE_NM       := 'CODM_AUTOSYS_SQL_MSTR';
    JPARAM.JOB_SQL_SRC_NM    := q'[
DECLARE
  PI_COMMIT_FLAG VARCHAR2(100) := 'Y';
  PO_SUCCESS_FLAG VARCHAR2(100);
  PO_RETURN_CODE VARCHAR2(100);
  PO_RETURN_MESSAGE VARCHAR2(100);
  v_Count       NUMBER:=0;
BEGIN
```

FIG. 14A

```
BEGIN
    SELECT COUNT(1)
    INTO   V_Count
    FROM   QMTSTG.STG_QM_IRRITANTS;
EXCEPTION
    WHEN OTHERS THEN
        v_Count:=0;
END;

HL_STG.GG_LND_TO_STAGE_DYNAMIC_PKG.ENABLE_DBMS_OUTPUT;

HL_STG.GG_LND_TO_STAGE_DYNAMIC_PKG.REP_MDX_TO_STG('REP_STG_QM_IRRITANTS',1,PI_COMMIT_FLAG
,PO_SUCCESS_FLAG,PO_RETURN_CODE,PO_RETURN_MESSAGE);

IF (V_Count>0) THEN
    PO_SUCCESS_FLAG:=NULL;
    PO_RETURN_CODE:=NULL;
    PO_RETURN_MESSAGE:=NULL;

HL_STG.GG_LND_TO_STAGE_DYNAMIC_PKG.REP_UPDATE_SOFT_DEL_IN('REP_STG_QM_IRRITANTS',PI_COMMI
T_FLAG,PO_SUCCESS_FLAG,PO_RETURN_CODE,PO_RETURN_MESSAGE);
    END IF;
END;
]';
    JPARAM.TRGT_SCHM_NM       := NULL;
    JPARAM.TRGT_TBL_NM        := NULL;
    JPARAM.PRCS_TYP_NM        := NULL;
    JPARAM.PROJECT_CD         := NULL;
    JPARAM.STS_TX             := NULL;
```

FIG. 14B

```
DECLARE
    JPARAM APP_UTIL.AUTOSYS_UTILITY_PKG.JOB_PARAMS;
    ERRORMSG VARCHAR2(4000);
    CNT      NUMBER := 0;
    MRG_ERROREXCEPTION;
BEGIN
    APP_UTIL.APP_UTILITY_PKG.ENABLE_DBMS_OUTPUT;
    JPARAM.ACTN_NM              := 'INS';
    JPARAM.PARAM_TYPE           := 'CMD';
    JPARAM.JOB_NM               := 'TEST_JOB_GUIDELINE_FRAMWORK';
    JPARAM.JOB_BOX_NM           := 'TEST_GUIDLINE_FRAMWORK';
    JPARAM.JOB_TYP_NM           := 'SQL';
    JPARAM.FILE_NM              := 'call_f_daily_loan_archive.sql';
    JPARAM.SCCS_EML_TO_TX       := 'DSDM_Success_EmailTo';
    JPARAM.FAIL_EML_TO_TX       := 'DSDM_Failure_EmailTo';
    JPARAM.PKG_SUB_FLDR_NM:     := 'SpecialtyServicing';
    JPARAM.STRT_DY_NM           := NULL;
    JPARAM.STRT_TM              := NULL;
    JPARAM.STRT_MINS            := NULL;
    JPARAM.COND_TX              := 's(LMD3_MASTER_MAINTENANCE_HOLD)';
    JPARAM.JOB_DE               := 'Archive data older than 7 months(220 days)';
    JPARAM.BAT_FILE_NM          := 'CODM_AUTOSYS_SQL_MSTR';
    JPARAM.JOB_SQL_SRC_NM       := q'[
WHENEVER SQLERROR EXIT 1;
DECLARE
```

Script Output

```
*** log_activity ***
*** get_Target_Obj_Detail_ID ***
Add autosys job info for TEST_JOB_GUIDELINE_FRAMEWORK  —1502
*** log_activity (2) ***
PL/SQL procedure successfully completed
```

FIG. 15

```
SELECT JOB_NM,BOX_NAME, STS_TX FROM APP_UTIL.AUTOSYS_JOBS
WHERE JOB_NM = 'TEST_JOB_GUIDELINE_FRAMEWORK';
```

| DATA GRID | | |
|---|---|---|
| JOB_NM | BOX_NM | STS_TX |
| TEST_JOB_GUIDELINE_FRAMEWORK | TEST_GUIDELINE_FRAMEWORK | (INITIATE) 1602 |

FIG. 16

```
SELECT * FROM APP_UTIL.ACTIVITY_AUDIT_LOG L
WHERE L.TARGET_TABLE_NAME LIKE 'AUTOSYS%'
ORDER BY 1 DESC;
```

AUTOSYS_UTILITY_PKG.REMOVE_JOB_RECORD ('INSERT_JOB_NAME', ERRORMSG) ;

FIG. 19

LINKAGE OF FIRED JOBS WITH INTERRELATED ACTIONS

FIELD OF TECHNOLOGY

Aspects of the disclosure relate to job controls systems for scheduling, monitoring and reporting jobs on a computer system.

BACKGROUND OF THE DISCLOSURE

In a well-known legacy job scheduling program, AutoSys TM, there are two legacy methods that a user can use to create job definitions: using the AutoSys TM Graphical User Interface (GUI); and Using the AutoSys TM Job Information Language ("JIL") through a command-line interface.

JIL (Job Information Language) files are created by developers. Job Information Language (JIL) is a scripting language that lets a user define and modify assets such as jobs, global variables, machines, job types, external instances, and blobs.

Legacy JIL files are environment specific, so one file is created for each environment to which a developer wanted to send a script.

In certain cases, JIL files are deployed through a manual deployment application. The manual deployment application is used to run JIL files manually on an AutoSys TM server.

Sequel (SQL) files are created by developers and deployed through the same manual deployment application. SQL files are typically stored in a specific folder on AutoSys TM servers.

Certain issues detracting from user friendliness are associated with legacy AutoSys TM processes. For example, because JIL file scripts are environment specific, developers are required to create separate scripts for each environment. In addition, for the same reason, production JIL scripts are not testable in any intended environment.

Furthermore, there is substantially no control over batch (BAT) files that are used in the jobs. A BAT file is a DOS batch file used to execute commands with the Windows Command Prompt (cmd.exe). It contains a series of line commands that typically might be entered at the DOS command prompt. BAT files are most commonly used to start programs and run maintenance utilities within Windows.

Also, because JIL files are fully manually created, these files are not created using any standard formats.

The SQL scripts that jobs need to run are stored as SQL files on the AutoSys TM machine. The SQL scripts require extra effort to deploy and be maintained.

In addition, there is not enough transparency regarding details of the jobs that are to be run (also commonly termed "fired") by AutoSys TM.

Querying jobs on AutoSys TM provides limited options and requires AutoSys TM knowledge to implement the query. Gathering additional information about jobs is manual and requires extra effort. Specifically, such information-gathering requires manually retrieving information related to source table, target table, job type (SQL, SQL Server Integration Services ("SSIS"), etc.), change history, etc.

Also, deploying JIL files through manual deployment uses large allotments of release time. AutoSys TM JIL deployments are typically done manually through an AutoSys TM User Interface.

In short, the conventional process of creating, updating, and deleting any AutoSys TM job requires a different script for each environment. In addition, when deploying the same jobs to other environments, the conventional process requires that a developer change the file name and job attributes every time. Any information about this job needs to be found through the job definition on AutoSys TM, which requires locating the BAT files and the SQL files. This locating typically requires manual searching for these files through the directories.

It would be desirable to auto-generate and deploy JIL files in a fashion that can work efficiently with multiple environments.

It would be further desirable to provide a configurable interface for customized job deployment in AutoSys TM.

It would be yet further desirable to provide a multi-factor validation for the various deployments in which the JIL files are being deployed.

SUMMARY OF THE DISCLOSURE

Apparatus and methods may include a configurable interface for enabling customized jobs deployment in Autosys TM. The interface may include a staging area. The staging area may be for deployment of a plurality of job scripts in Autosys TM and/or for providing a verification of the deployment. Each of the plurality of job scripts may be interrelated with at least one other of the plurality of job scripts.

The interface may include a status line. The status line may indicate whether the job script has been deployed in Autosys TM or is set to be deployed to Autosys TM. The interface may include an import utility. The import utility may be configured to import selected contents of a log folder from Autosys TM.

The interface may include a queryable review utility. The import utility may be configured to provide to the review utility the selected contents. The review utility may be configured to confirm that one or more of the plurality of job scripts was fired in Autosys TM. The review utility may be configured to confirm the status of each of the job scripts vis-à-vis any other job scripts with which each job script is interrelated.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIGS. 3A and 3B show creating, according to the disclosure, a script to populate metadata tables;

FIG. 4 shows a data grid according to the disclosure;

FIG. 5 shows a sample of log file content from the AutoSys TM log;

FIG. 6 shows a sample JIL file content;

FIGS. 7A and 7B show a script for updating a job;

FIGS. 8A-8C describe the labels used in one or more embodiments of an SQL script according to the disclosure;

FIG. 9 shows a text file that represents the JIL file format;

FIG. 10 shows an exemplary snippet of the SQL script for a box and how to fill out the parameters to insert a specific box into the database;

FIG. 11 shows a script output according to the disclosure;

FIG. 12 shows a data grid displaying an initiate status according to the disclosure;

FIG. 13 a table indicating that a certain job has successfully been inserted into the database;

FIGS. 14A and 14B shows a snippet of SQL script according to the disclosure;

FIG. 15 shows another script output according to the disclosure, similar to the output shown in FIG. 11;

FIG. 16 shows another data grid displaying an initiate status according to the disclosure, similar to FIG. 12;

FIG. 17 shows a table that a user can review to verify the job has been successfully inserted into the database;

FIG. 18 shows a data grid that a user can use to display jobs that pertain to a specific project code or no project; and FIG. 19 shows a job script for removing a job record from a database.

DETAILED DESCRIPTION OF THE DISCLOSURE

Figure 1:
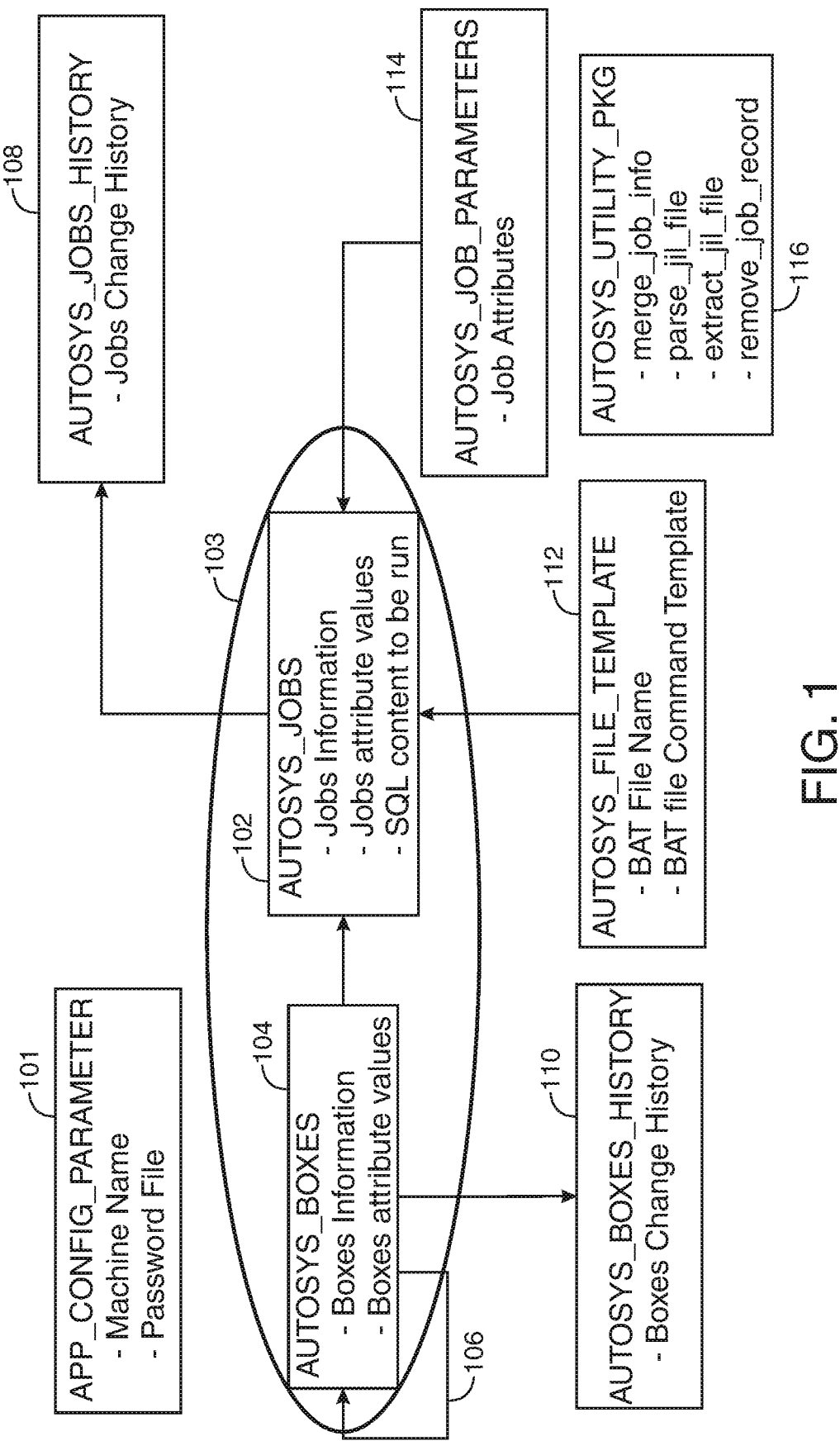
FIG. 1 shows a schematic representation of the various tables and packages according to the disclosure.

Aspects of the disclosure relate to architectures and methods associated therewith according to certain embodiments. The architectures and methods may contain and employ frameworks.

An AutoSys TM automation framework(s) according to the disclosure (hereinafter, the "framework") preferably enables users to remove repetitive steps in creating, updating and deleting AutoSys TM jobs. Moreover, some embodiments of such a framework(s) provide a single, accessible, location for information about jobs and boxes. In addition, some embodiments of such framework(s) include a process or processing to generate, update or delete multiple and preferably all jobs on AutoSys TM without having to manually make a JIL file for each file to be generated, updated or deleted in AutoSys TM.

According to preferred embodiments, for a particular job a single script suffices for a deployment region. Such exemplary deployment regions include but are not limited to, inter alia, an agile testing environment, a user testing environment, a production/performance testing environment, a pre-production environment and a production environment. The tables described below may be used to provide all the information about the jobs and boxes by querying the information needed. In certain embodiments, one single job in AutoSys TM preferably creates, updates, or deletes all the jobs necessary based on the script. Furthermore, if there is a need to verify or view the JIL file for this specific job, it can be extracted through the EXTRACT_JIL_FILE function, which is described in more detail below.

Apparatus and methods may include a configurable interface for enabling customized jobs deployment in Autosys TM. The interface may include a staging area. The staging area may be for deployment of a plurality of job scripts in Autosys TM and/or for providing a verification of the deployment. Each of the plurality of job scripts may be interrelated with at least one other of the plurality of job scripts.

The interface may include a status line. The status line may indicate whether the job script has been deployed in Autosys TM or is set to be deployed to Autosys TM.

The interface may include an import utility. The import utility may be configured to import selected contents of a log folder from Autosys TM.

The interface may include a queryable review utility. The import utility may be configured to provide to the review utility the selected contents. The review utility may be configured to confirm that one or more of the plurality of job scripts was fired in Autosys TM. The review utility may be configured to confirm the status of each of the job scripts vis-à-vis any other job scripts with which each job script is interrelated.

The queryable review utility may be configured to confirm the status of a second job script. The second job script may be configured to be fired in Autosys TM only upon a completion of a first job script.

The queryable review utility may be configured to confirm the status of a first job script. A completion of the first job script may trigger a firing of a second job script.

The queryable review utility may be configured to confirm the status of the job script. The job script may be configured to be fired in Autosys TM only upon an activation of a box.

The queryable review utility may be configured to confirm an active status of a box. A completion of the job script may trigger an activation of the box.

When no scheduling conditions exist (DT_COND_TX=0), then the configurable interface may set the following fields in the job as null: a STRT_MINS field, a STRT_TM field, and a STRT_DY_NM field. When at least one scheduling condition exists (DT_COND_TX=1), then the configurable interface may set a field STRT_DY_NM to a value that is not null.

When no scheduling conditions exist (DT_COND_TX=0), then the configurable interface may set the following fields in the job as null: a STRT_MINS field, a STRT_TM field, and a STRT_DY_NM field. When at least one scheduling condition exists (DT_COND_TX=1), then the configurable interface may set either a STRT_MINS field or a STRT_TM field as active, but not both the STRT_MINS field or the STRT_TM field as active.

One log file may be created for each job script that was fired.

The review utility may be configured to display log file content imported from an Autosys TM server. Each line of the log file content may correspond to a one of the plurality of job scripts deployed in an instance of Autosys TM. Each line of the log file content may be identifiable by a <job name>.log title.

The import utility may be configured to import selected JIL files from the Autosys TM server. Each of the JIL files may correspond to one of the plurality of job scripts.

The interface may be configured to load the plurality of job scripts listed therein into Autosys TM via a batch job. The batch job may be for deploying the jobs in Autosys TM. The batch jobs may be deployed such that the jobs are deployed to Autosys TM at greater than a predetermined accuracy rate.

Apparatus and methods may include a method for enabling customized jobs deployment in Autosys TM, reviewing of deployment results of said jobs in Autosys TM, and querying said deployment results. The method may include providing a verification of the deployment in a staging area. The staging area may be configured for arranging and deploying a plurality of job scripts in Autosys TM. Each job script may be interrelated with one or more other job scripts.

The method may include visually indicating, in a status line, whether the job script has been deployed in Autosys TM or is set to be deployed to Autosys TM. The method may include further visually indicating in what way the job script is interrelated with one or more other job scripts.

The method may include importing selected contents of a log folder from Autosys TM. The importing may be performed using an import utility.

The method may include providing the selected contents to a queryable review utility. The queryable review utility may be configured to confirm that one or more of the plurality of job scripts was fired in Autosys TM. The queryable review utility may be configured to confirm the status of each of the job scripts vis-à-vis any of the other job scripts with which each job script is interrelated.

The queryable review utility may be configured to confirm the status of a second job script. The second job script may be configured to be fired in Autosys TM only upon a completion of a first job script.

The queryable review utility may be configured to confirm the status of a first job script. A completion of the first job script may trigger a firing of a second job script.

The queryable review utility may be configured to confirm the status of the job script. The job script may be configured to be fired in Autosys TM only upon an activation of a box.

The queryable review utility may be configured to confirm an active status of a box. A completion of the job script may trigger an activation of the box.

When no scheduling conditions exist (DT_COND_TX=0), the methods may include setting the following fields in the job to a null value: a STRT_MINS field, a STRT_TM field, and a STRT_DY_NM field. When at least one scheduling condition exists (DT_COND_TX=1), the methods may include setting a field STRT_DY_NM to a value that is not null.

When no scheduling conditions exist (DT_COND_TX=0), the methods may include setting the following fields in the job to a null value: a STRT_MINS field, a STRT_TM field, and a STRT_DY_NM field. When at least one scheduling condition exists (DT_COND_TX=1), then, the methods may include setting either a STRT_MINS field or a STRT_TM field to an active value, but not both the STRT_MINS field or the STRT_TM field as active values.

One log file may be created for each job script that was fired.

The review utility may be configured to display log file content imported from an Autosys TM server. Each line of the log file content may correspond to a one of the plurality of job scripts deployed in an instance of Autosys TM.

Each line of the log file content may be identifiable by a <job name>.log title.

The import utility may be configured to import selected JIL files from the Autosys TM server. Each of the imported JIL, files may correspond to one of the plurality of job scripts.

The methods may include loading the plurality of job scripts listed therein into Autosys TM via a batch job. The batch job may be a batch job for deploying the jobs in Autosys TM such that the jobs are deployed to Autosys TM at greater than a predetermined accuracy rate. The predetermined accuracy rate of the files generated for Autosys TM may obtain close to a 90 percent success rate. That is to say that the predetermined accuracy rate of the files generated for Autosys TM may obtain be within five to ten percent a 90 percent success rate—i.e., a rate at which the files generated for Autosys TM are successfully fired in Autosys TM.

The framework has additional tables and packages as part of APP_UTIL in all environments. The following disclosure and references to figures provide a description of what tables and packages contain as well as their respective purposes.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows a schematic representation of the various tables and packages describe heretofore. The architecture shown in FIG. 1 preferably illustrates an exemplary architecture of metadata tables that may be arranged for use with systems and methods according to the disclosure. Specifically, FIG. 1 shows the following tables APP_CONFIG_PARAMETER 101, AUTOSYS_BOXES 104, AUTOSYS_BOXES_HISTORY 110, AUTOSYS_FILE_TEMPLATE 112, AUTOSYS_JOBS 102, AUTOSYS_JOBS_HISTORY 108 and AUTOSYS_JOBS_PARAMETERS 114 and the following package AUTOSYS_UTILITY_PKG 116. The tables and the package are each called out specifically below.

AUTOSYS TM JOBS table is shown at table 102. Such a table 102 may preferably include AutoSys TM jobs information, AutoSys TM jobs attribute values and SQL content to be run for the jobs. There are three types of AutoSys TM jobs: command, file watcher, and box. Command jobs execute commands; file watcher jobs watch for the arrival of a specified file; and box jobs are containers that hold other jobs (including other boxes). In the AutoSys TM environment, the box is a container of other jobs. A box can be used to organize and control process flow. The box itself performs no actions, although it can trigger other jobs to run. An important feature of this type of job is that boxes can be put inside other boxes.

The AUTOSYS TM BOXES table is shown at 104. This table may include boxes information and boxes attribute values. A box in AUTOSYS TM BOXES table 104 itself performs no actions, although it can trigger other jobs to run.

An important feature of this type of job is that boxes can be put inside of other boxes. To the extent that the box is triggering other jobs to run, is shown schematically as feedback line 106, for feeding information from table 104 back to table 104. AUTOSYS TM BOXES table 104 may preferably provide boxes to AUTOSYS TM JOBS table 102.

In addition, AUTOSYS TM JOBS table 102 may provide job changes information to AUTOSYS TM JOBS HISTORY table 108. AUTOSYS TM JOBS HISTORY table 108 may preferably store jobs change history information. AUTOSYS TM BOXES table 104 may provide box change information to AUTOSYS TM Boxes History table 110. AUTOSYS TM Boxes History table 110 may preferably store boxes change history information.

AUTOSYS TM FILE TEMPLATE 112 may provide BAT file name information and BAT file command template(s) to AUTOSYS TM JOBS table 102. AUTOSYS TM JOB PARAMETERS 114 may provide job attributes to AUTOSYS TM JOBS table 102.

Further in-depth analysis of each of the components in FIG. 1 is provided below.

AUTOSYS_BOXES 104

This table provides parameters for creating a box, updating a box, and/or deleting a box. These are the same parameters typically found in a JIL file for AutoSys TM. Therefore the appropriate column within the tables in AUTOSYS_BOXES pertains to that specific parameter found in the legacy JIL files. For example, STRT_DY_NM is the days_of_week in a JIL file and refers to the day of the week in which the job will start, such as Monday. This table preferably maintains the most recent record, where ACTV_FL indicates whether the record is still in use and active.

AUTOSYS_BOXES_HISTORY 110

This table preferably keeps track of all the changes that occurs in the table AUTOSYS_BOXES. The latest record will show up in the actual table AUTOSYS_BOXES, while the previous version of this record (if any) is maintained in AUTOSYS_BOXES_HISTORY, including a time stamp of an update.

AUTOSYS_JOBS 102

This table provides the parameters for creating a job, updating a job, and/or deleting a job. These are the same parameters found in a JIL file for AutoSys TM. Therefore the appropriate column in this table pertains to that specific parameter. This table preferably always maintains the most recent record, where ACTV_FL represents whether the record is still in use and active.

AUTOSYS_JOBS_HISTORY 108

This table keeps track of all the changes that occur in the table AUTOSYS_JOBS. The latest record shows up in the actual table AUTOSYS_JOBS, while the previous version of this record (if any) is maintained in AUTOSYS_JOBS_HISTORY, including a time stamp of an update.

AUTOSYS_JOBS_PARAMETERS 114

This table includes parameters needed for jobs and the placeholder name used for these parameters. For example, the command line consists of various parameters that are needed for the job to fully function. The placeholder names that are used in the command line include FILENAME, PWDFILENAME, SUCCESSEMAILTO, FAILUREE-MAILTO, and similar placeholder names.

AUTOSYS_FILE_TEMPLATE 112

This table includes BAT file names that have been configured in order to develop the command line in a JIL file. The column BAT_FILE_NM will provide the original BAT file name that is used in AutoSys TM. The column TEM-PLT_CMD_TX includes the parameters needed in the command line to use this specific BAT file.

VW_AUTOSYS_JOB_INFO 103

Oval 103 depicted surrounding AUTOSYS_BOXES 104 and AUTOSYS_JOBS 102 represents a specific view that preferably combines all the records from AUTOSYS_BOXES and AUTOSYS_JOBS into one place in order to enable querying for specific jobs or boxes in one location.

AUTOSYS_UTILITY_PKG 116

This package provides the functionality for the framework automation to occur. Such functionality may include, for example, transferring a SQL script into an Oracle TM table and then being able to actually run the job in AutoSys TM through a simple extraction of the JIL file from the Oracle TM table. The following are several exemplary procedures and functions in this package:

1) MERGE_JOB_INFO: This function uses a script provided to either insert, update, or delete the job from the appropriate metadata tables by using a JOB PARAM type as one of the arguments. If there are any functionality-affecting issues, the function returns an error message.

2) PARSE_JIL_FILE: In certain embodiments, once AutoSys TM JIL content is transferred over to the database, it uses this function to parse the JIL content. The PARSE_JIL_FILE inserts the file into metadata tables based on the file's parameters.

3) EXTRACT_JIL_FILE: This function enables a user to extract a job that resides in the database and then transforms the job into a JIL file format. This JIL file format is similar to the JIL files found in AutoSys TM when one looks up Job Definition. The only argument needed for this function is a job name. Then the EXTRACT_JIL_FILE can extract the parameters of that specific job into a JIL file format.

4) REMOVE_JOB_RECORD: This function enables a user to remove the job record from the table AUTOSYS_JOBS if it is a job or from AUTOSYS_BOXES if it is a box. It will preferably only be removed from these active tables if it is no longer in AutoSys TM and if it is inactive. Removal from the active tables preferably enables, inter alia, the user to reuse the name of the job. The history of this job record can preferably be maintained, even after removal, in AUTO-SYS_JOBS_HISTORY or AUTOSYS_BOXES_HISTORY.

Figure 2:
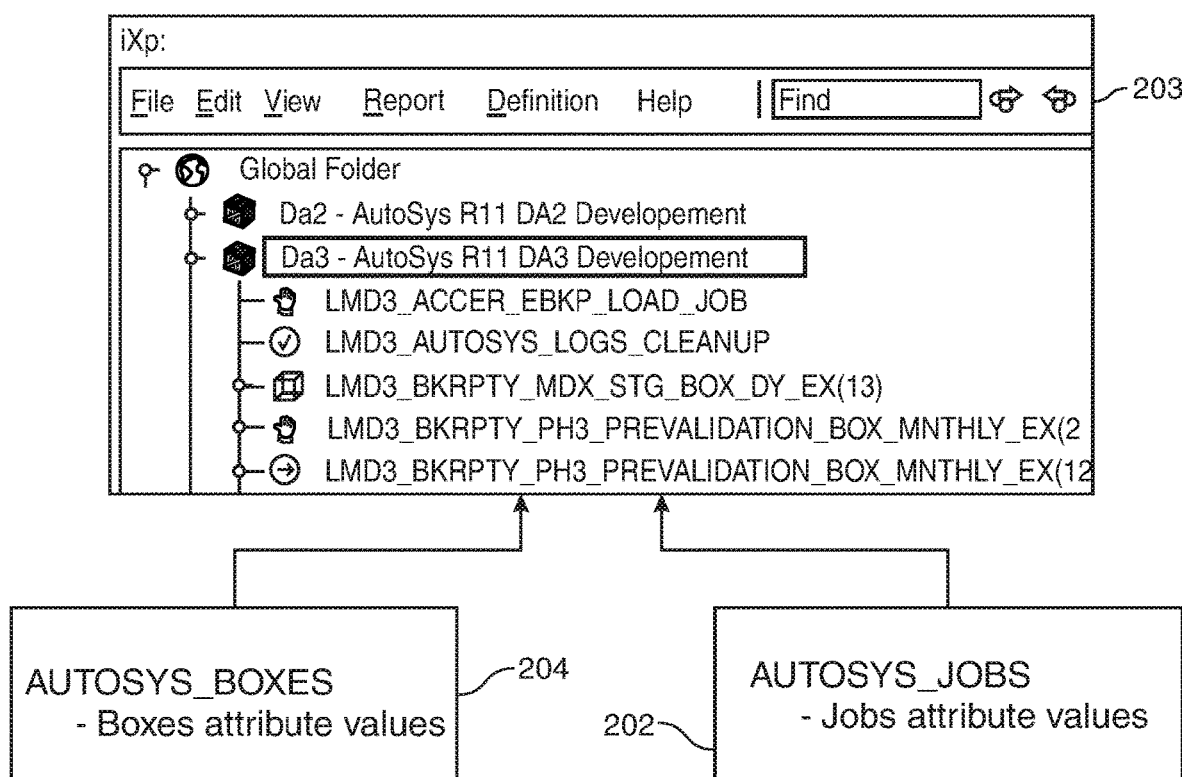
FIG. 2 shows AutoSys TM job information stored in a data grid according to the disclosure.

FIG. 2 shows AutoSys TM job information displayed in AutoSys TM user interface 203. Included in the information are AUTOSYS TM Boxes 204 (which include the boxes attribute values) and AUTOSYS TM JOBS 202 (which include the jobs attribute values).

FIGS. 3A and 3B show creating a script to populate metadata tables. Step 302 shows the step for generating the AUTOSYS TM UTILITY PACKAGE which merges the job information, including parameters for the job, and the error message information.

FIGS. 4A and 4B show a data grid 402. Data grid 402 may be considered a staging area for the script to be deployed and verified. Column 404 is a status line STS_TX. It indicates whether the job has been completed or is set to be deployed and generated for Autosys TM.

Once the script has been created and verified, and the metadata tables have been populated, the framework may generate, update or delete the job in AutoSys TM.

A user can check record status after job creation is complete (STS_TX column 404 in metadata tables). This column shows, with respect to each job, one of the following:

COMPLETE: Job creation is successful; or

FAILED: Process failed.

For each record, one Log file will be created. FIG. 5 shows a sample of log file content from the AutoSys TM log described above. The log file name will be <job name>.log.

The log file name is <JOB NAME>.log. A file name example could be the following LMD3_HL_CTR_DM_F_ALS_WORKFLOW_DLY_COUNT_CHECK_DY.log.

A user can check <AutoSys Server>\AutoSys_Batch\AutoSysJilFiles\Archive folder to see the JIL file content. For each record, one JIL file will be created. The JIL file name will be <JOB NAME>.jil_<DATE>. A file name example is LMD3_HL_CTR_DM_F_ALS_WORK-FLOW_DLY_COUNT_CHECK_DY.jil_20170419

FIG. 6 shows a sample JIL file content: (LMD3_HL_CTR_DM UPDT_FALSWRKFDLY_DAS-SOC_DY.jil_20170417).

FIGS. 7A and 7B show a script for updating a job. It should be noted that, in such a script, JPARAM.ACTN_NM:='UPD' at 702 indicates that the script is for updating a job. At 704, AUTO_SYS_UTILITY_PKG.MERGE_JOB_INFOR(JPARAM,ERRORMSG) is for creating the script.

FIGS. 8A-19 correspond to additional description of the embodiments set forth herein. More specifically, the table shown at 8A-8C presents an exemplary SQL script that is used to insert, update, or delete jobs, boxes, or even insert boxes into boxes. If any parameter is left blank, it will be NULL in the tables and it will not show up in the JIL file created. FIGS. 8A-8C describe the labels used in one or more embodiments of this SQL script:

In order to extract a single JIL file, a user can use a query similar to the following, where INSERT_JOB_NAME is the actual job name from which the user is trying to extract the JIL file: SELECT APP_UTIL.AUTOSYS_UTILI-TY_PKG.EXTRACT_JIL_FILE ('INSERT JOB NAME') FROM DUAL.

Following the query, a user can select and click a record from a data grid (such as Data Grid 402 of FIGS. 4A and 4B) and the selection will return the Text file that represents the JIL file format (see FIG. 9).

The JPARAMs shown in FIG. 10 describe how to insert a box in a database. Specifically, FIG. 10 shows an exemplary snippet of the SQL script and how to fill out the parameters to insert this specific box into the database. It should be noted that PARAM_TYPE is BOX and the parameter JOB_NM is the actual box name.

After inserting the proper parameters in the script, the framework may generate the script in the proper database. The Script Output should display the command "PL/SQL procedure successfully completed," as shown at 1102 in FIG. 11.

Afterwards, the framework may verify that the box has been inserted into the table and may check the STS_TX status. It should be noted that STS_TX status should be set to INITIATE, as shown at 1202 in FIG. 12. This status is needed in order for the job to be generated or updated and inserted in AutoSys TM. The portion of the disclosure, below, corresponding to how to insert boxes and jobs in AutoSys TM, provides more particular instructions on this procedure.

The framework may then verify, using the APP_UTI-L.ACTIVITY_AUDIT_LOG table as shown in FIG. 13, that the job has successfully been inserted into the database.

FIGS. 14A-14B provide a snippet of the SQL script and how to fill out the parameters to insert this specific job into the database. It should be noted that the parameter JOB_NM at 1402 is the actual job name and JOB_BOX_NM 1404 is the box name, if any, in which the job is located.

After inserting the proper parameters in the script, the script may be generated in the appropriate database. The Script Output should display the command "PL/SQL procedure successfully completed", as shown at 1502 of FIG. 15.

Afterwards, a user can verify that the job has been inserted into the table and check the STS_TX status. It should be noted that STS_TX status should be INITIATE, as shown at 1602 of FIG. 16. This status is needed in order for the job to be generated or updated and inserted in AutoSys TM. The portion of the disclosure, below, relating to how to insert boxes and jobs in AutoSys TM, sets forth instructions on this procedure.

The framework may present APP_UTIL.ACTIVI-TY_AUDIT_LOG table so the user can verify the job has been successfully inserted into the database, as shown at FIG. 17.

The following portion of the disclosure relates to how to insert boxes and jobs into AutoSys TM. First, a user should verify that all jobs and boxes that will be inserted into AutoSys TM have STS_TX set as INITIATE.

Figure 18:
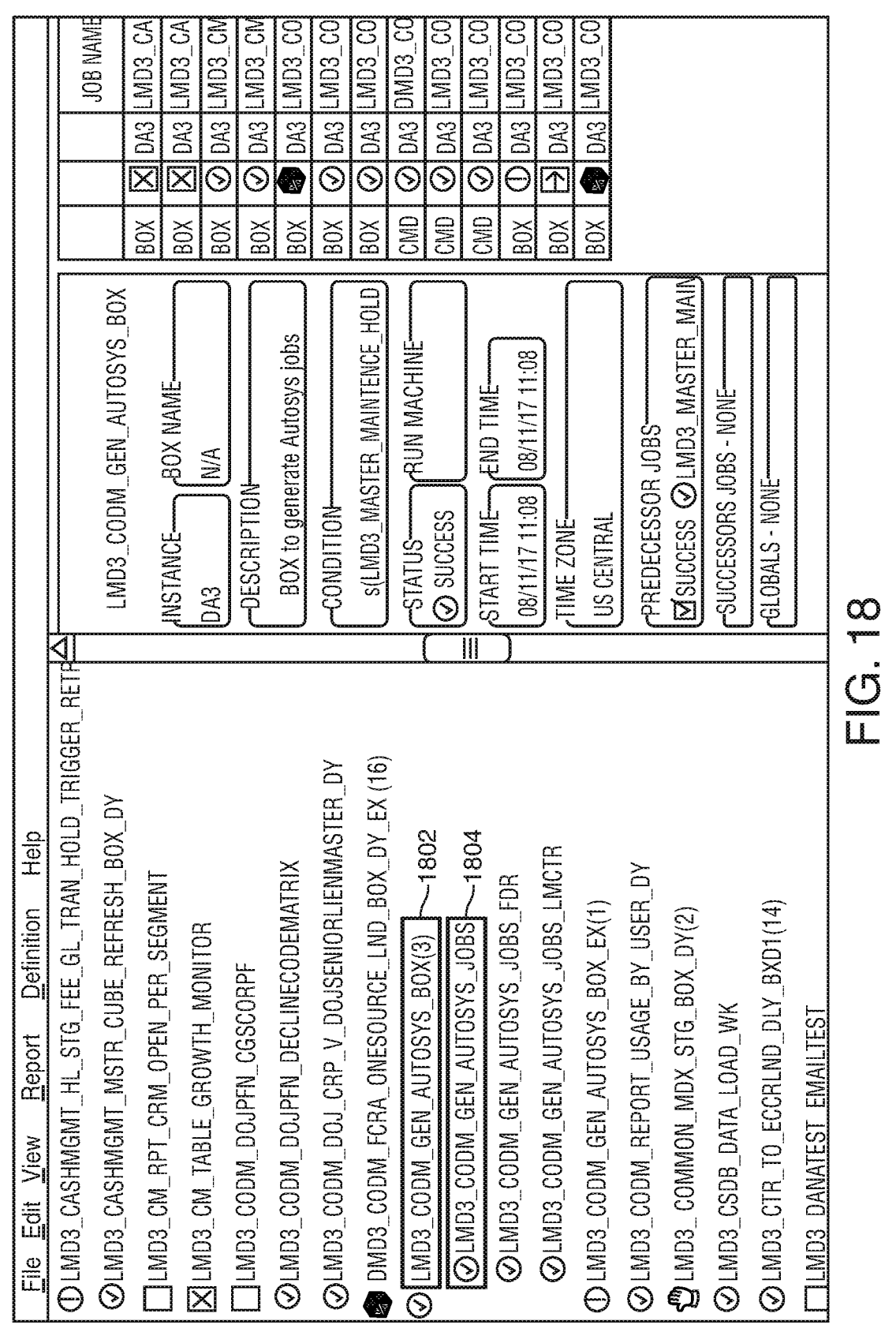

Then, in AutoSys TM, a user can find the box LMD3_CODM_GEN_AUTOSYS_BOX, as shown at 1802 of FIG. 18. This box contains jobs that pertain to a specific project code or no project code at all.

Thereafter, a user can find and run the appropriate job if the user has a project code or else run LMD3_CODM_GEN_AUTOSYS_JOBS, as shown at 1804, which pertains to jobs with no project code. These specific jobs process all the jobs and boxes in the metadata tables that are currently in INITIATE state and create them in AutoSys TM.

It is preferable that the job then be verified that the job ran successfully. This verification can be obtained by reviewing the execution log of all processed jobs under this folder: \\MACHINE_NAME\AutoSys_Batch\AutoSysJil-Files\Log.

Then the user can verify, using LMD3_CODM_GEN_AUTOSYS_BOX 1804, that the inserted jobs and inserted boxes appear under a node, such as a computer workstation, from which the user ran the specific job.

Thereafter, the user can verify that the newly added jobs and boxes have been updated with "COMPLETE" for STS_TX in the database.

It should be noted that the ExaData TM box is found at LMD3_CODM_GEN_AUTOSYS_BOX_EX.

The following describes how to update jobs and boxes in a database according to the disclosure set forth herein.

When updating a box or job, there are certain fields that will not change the STS_TX status and do not need the AutoSys TM job to be run if STS_TX is COMPLETE. These fields include:

TRGT_SCHM_NM: Target Schema Name
TRGT_TBL_NM: Target Table Name
PRCS_TYP_NM: Process Type Name
PROJECT_CD: Project Code When updating a box or job, the ACTN_NM may be changed to 'UPD' in the script.

When updating a box or job, preferably all the box or job information that is currently inserted about the box or job being updated should be in the script, similar to the changes discussed above with respect to FIG. 18. If any information is left out, then the update script preferably changes it to NULL.

Once the script has been changed to apply the desired changes, the script may be run in the intended database. Afterwards, the status should change to INITIATE.

The record before the box is updated will now be located in (as shown in FIG. 1) AUTOSYS_BOXES_HISTORY 110 or the record before the job is updated will now be located in AUTOSYS_JOBS_HISTORY 108. The changes applied should preferably be visible in AUTOSYS_BOXES 104 and AUTOSYS_JOBS 102.

Afterwards, a user can verify that his or her box or job has been updated in the table and check the STS_TX status. It should be noted that STS_TX status should be set to INITIATE. This status is needed in order for the box or job to be generated and updated on AutoSys TM. Instructions for this procedure are set forth in more detail below in the portion of the disclosure relating to how to update boxes and jobs in AutoSys TM.

It can also be verified that the APP_UTIL.ACTIVI-TY_AUDIT_LOG table has successfully been inserted into the database.

In order to update boxes and jobs in AutoSys TM, a user can find the box LMD3_CODM_GEN_AUTOSYS_BOX. This box contains jobs that pertain to a specific project code or no project code at all. A user can find and run the appropriate job if a user has a project code or else can run LMD3_CODM_GEN_AUTOSYS_JOBS that pertains to jobs with no project code. These specific jobs can process all the jobs and boxes in the metadata tables that are currently in INITIATE state. Following the processing, these specific jobs create all the processed jobs and boxes in AutoSys TM.

The foregoing is similar to the changes made above, as described in the portion of the written specification above, corresponding to FIG. 18.

A user can verify that the job ran successfully. For example, the user can see the execution log of all processed jobs under the folder: \\MACHINE_NAME\AutoSys_Batch\AutoSysJilFiles\Log1.

A user can verify that the jobs and boxes that the user has updated appear under the node from which the user ran the specific job: LMD3_CODM_GEN_AUTOSYS_BOX.

A user can verify that the updated jobs and boxes have been updated with "COMPLETE" for STS_TX in the database. It should be noted that the ExaData TM box is LMD3_CODM_GEN_AUTOSYS_BOX_EX.

The following relates to how to lock boxes and jobs records in the metadata tables.

This feature is typically only available when inserting or updating a box or job. It was originally designed to provide users more control over the boxes or jobs records they inserted into metadata tables. If a box or job record is in 'LOCK' status, this means that if GEN_AUTOSYS job gets run, these LOCK records will not get processed. In order to 'LOCK' a box or job record, a user needs to populate the parameter 'JPARAM.STS_TX' to 'LOCK' when calling the procedure AUTOSYS_UTILITY_PKG.MERGE_JOB_INFO.

Whenever a user wants to unlock a box or job, he or she needs to call on the procedure APP_UTIL.UPDATE_JOB_STATUS with two different arguments, the first being the box name or job name and the second being the status 'INITIATE'.

The following relates to how to delete a specific box with jobs from the database.

The delete action name preferably does not remove the record from the table. The delete action name enables the user to remove the box from AutoSys TM and updates the activity flag to 0. However, the record still exists in the table AUTOSYS_BOXES and therefore does not allow a user to reuse this specific box name. The portion of the disclosure below relating to how to remove job records includes instructions on the procedure for removing the record from the table.

When deleting a box together with a job contained therein (similar to delete_box in AutoSys TM), the ACTN_NM is changed to 'DEL' in the script and only three different parameters are typically needed:

ACTN_NM: Should be 'DEL'
PARAM_TYPE: BOX
JOB_NM: Name of the box that will be deleted Once a user has changed the script to apply the changes, the script may be run in the database from which the job is intended to be deleted. Afterwards, the status should change to INITIATE.

The record before the box is deleted can now be located in AUTOSYS_BOXES_HISTORY 110.

Afterwards, a user can verify that his or her job action name has been indeed changed to 'DEL' in the table and can check the STS_TX status. It should be noted that STS_TX status should be set to INITIATE. This status is needed in order for the job to be generated and updated on AutoSys TM. The selection below relating to how to delete a box and jobs in AutoSys TM, includes instructions on this procedure.

The following relates to how to delete a specific job from the database.

The delete action name preferably does not remove the record from the table. The delete action name enables the user to remove the job from AutoSys TM and updates the activity flag to 0. However, the record still exists in the table AUTOSYS_JOBS and therefore does not allow a user to reuse this specific job name. The portion of the disclosure below relating to how to remove job records includes instructions on the procedure for removing the record from the table.

When deleting a single job (similar to delete job in AutoSys TM), the ACTN_NM will be changed to 'DEL' in the script and only three different parameters will be needed:

ACTN_NM: Should be 'DEL'
PARAM_TYPE: CMD
JOB_NM: Name of the job that stands to be deleted Once a user has changed the script to apply the above-mentioned changes, he or she can run the script in the intended database. Afterwards, the status should change to INITIATE.

The record before the job is deleted can now be located in AUTOSYS_JOBS_HISTORY 108.

Afterwards, a user can verify that his or her job action name has been indeed changed to 'DEL' in the table and can check the STS_TX status. It should be noted that STS_TX status should be set to INITIATE. This status is needed in order for the job script to be generated and updated on AutoSys TM. The portion of the disclosure relating to how to delete boxes and jobs in AutoSys TM sets forth further instructions on this procedure.

An explanation of how to delete boxes and jobs in AutoSys TM is set forth below. In AutoSys TM, a user finds the box LMD3_CODM_GEN_AUTOSYS_BOX. This is similar to the changes made above, as described in the portion of the written disclosure corresponding to FIG. 18. This box preferably contains jobs that pertain to a specific project code or no project code at all.

A user can find and run the appropriate job if he or she has a project code. Otherwise, the user can run LMD3_CODM_GEN_AUTOSYS_JOBS, which pertains to jobs with no project code. These specific commands process all the jobs and boxes in the metadata tables that are currently in INITIATE state and creates them in AutoSys TM.

Following the running of the job, the framework may verify that the job ran successfully. One place to perform such a verification is the execution log of all processed jobs. These jobs exist under the folder: \\MACHINE_NAME\AutoSys_Batch\AutoSysJilFiles\Log.

In addition, the framework may enable verification that the jobs and boxes that have been updated appear under the node from which the specific job was run—i.e., LMD3_CODM_GEN_AUTOSYS_BOX.

Also, the framework can verify that the deleted jobs and boxes have been updated with "COMPLETE" for STS_TX in the database.

It should be noted that the ExaData TM box is LMD3_CODM_GEN_AUTOSYS_BOX_EX.

The following relates to how to remove job records. Removing a job record from the database will only typically be allowed when the job does not exist in AutoSys TM. This function enables a user to remove the job record from the table AUTOSYS_JOBS or AUTOSYS_BOXES, but any history that exists of this job still resides in AUTOSYS_JOBS_HISTORY or AUTOSYS_BOXES_HISTORY.

When removing a job record, the function REMOVE_JOB_RECORD may be used from the package APP_UTIL.AUTOSYS_UTILITY_PKG.

This function includes two parameters, the first being the job name and the second being the error message. A user may find the script shown in FIG. 19 for an example of the setup of this function.

Once the user has changed the script to apply changes, he or she can run the script in the intended database. The user can also confirm that the job has been removed from the table AUTOSYS_JOBS or AUTOSYS_BOXES.

The record before the job is removed is now preferably located in AUTOSYS_JOBS_HISTORY or AUTOSYS_BOXES_HISTORY.

Various validation checks within the framework exist. These validation checks ensure that the box or job is properly configured for insertion into AutoSys TM, and then that it properly inserted into the database. These validation checks serve to reduce functionality-affecting issues when inserting the job into AutoSys TM.

The following are some of the validation requirements/characteristics that can be checked.

Only INS, UPD, or DEL are acceptable action names. These are, in the preferred embodiments set forth herein, case sensitive.

In preferred embodiments, only CMD or BOX are acceptable parameter types.

The only specified project codes available and acceptable are NULL, FDR, or LMCTR.

The only job status available and acceptable are NULL, INITIATE or LOCK.

A job name should not exist when inserting a job.

A job name should exist and be active in order to use the update or delete action names.

Job status should not change from COMPLETE to LOCK if there are no changes being made.

A box name should exist and be active in order to use the update or delete action names.

A job should be under lock status if the box in which the job is contained is currently under lock status.

A batch file name should exist within the AUTOSYS_FILE_TEMPLATE in order to perform an action.

Job name or box name should be less than 64 characters.

If there are no scheduling conditions (DT_COND_TX=0), then the following fields should be null: STRT_MINS, STRT_TM, and STRT_DY_NM.

If there are scheduling conditions (DT_COND_TX=1), then the field STRT_DY_NM should not be null.

If there are scheduling conditions (DT_COND_TX=1), either STRT_MINS or STRT_TM should be active, but not both at the same time.

The following conditions are not used in BOX and therefore should be NULL: JOB_TYP_NM,FILE_NM, SCCS_EML_TO_TX,FAIL_EML_TO_TX,PKG_SUB_FLDR_NM, and MAX_RUN_ALRM,RETRY_CT,PROC_NM,MRG_DY_CT,BAT_FILE_NM,JOB_SQL_SRC_NM As another example of some of the validation requirements/characteristics that can be checked: If a record is in delete status, it is not allowed to be updated or deleted again.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods involving linkage of fired jobs with interrelated actions are provided. Persons skilled in the art will appreciate that the present invention can be practiced by other than the described embodiments, which are presented for purposes of illustration rather than of limitation, and that the present invention is limited only by the claims that follow.

What is claimed is:

1. A configurable interface for enabling customized jobs deployment in Autosys TM, the interface comprising:
    a staging area for deployment of a plurality of job scripts in Autosys TM and for providing a verification of the deployment, each of said plurality of job scripts being interrelated with at least one other of the plurality of job scripts;
    a status line that indicates whether a first job script has been deployed in Autosys TM or is set to be deployed to Autosys TM;
    an import utility configured to import selected contents of a log folder from Autosys TM; and
    a queryable review utility, said import utility further configured to provide to the review utility the selected contents, said review utility configured to confirm that one or more of the plurality of job scripts was fired in Autosys TM, wherein the review utility is further configured to confirm the status of each of the job scripts vis-à-vis any other job scripts with which each job script is interrelated;
wherein the configurable interface is configured to load the plurality of job scripts listed therein into Autosys TM via a batch job, the batch job for deploying the jobs in Autosys TM such that the jobs are deployed to Autosys TM at greater than a predetermined accuracy rate.

2. The configurable interface of claim 1, wherein the queryable review utility is further configured to confirm the status of a second job script, said second job script configured to be fired in Autosys TM only upon a completion of a first job script.

3. The configurable interface of claim 1, wherein the queryable review utility is further configured to confirm the status of a first job script, a completion of the first job script that triggers a firing of a second job script.

4. The configurable interface of claim 1, wherein the queryable review utility is further configured to confirm the status of the job script, said job script configured to be fired in Autosys TM only upon an activation of a box.

5. The configurable interface of claim 1, wherein the queryable review utility is further configured to confirm an active status of a box, a completion of the job script that triggers an activation of the box.

6. The configurable interface of claim 1, wherein, when no scheduling conditions exist (DT_COND_TX=0), then the following fields in the job are null: a STRT_MINS field, a STRT_TM field, and a STRT_DY_NM field, and when at least one scheduling condition exists (DT_COND_TX=1), then a field STRT_DY_NM is not null.

7. The configurable interface of claim 1, wherein, when no scheduling conditions exist (DT_COND_TX=0), then the following fields in the job are null: a STRT_MINS field, a STRT_TM field, and a STRT_DY_NM field, and when at least one scheduling condition exists (DT_COND_TX=1), then, either a STRT_MINS field or a STRT_TM field is active, but not both the STRT_MINS field or the STRT_TM field are active.

8. The configurable interface of claim 1, wherein one log file is created for each job script that was fired.

9. The configurable interface of claim 1, wherein the review utility is further configured to display log file content imported from an Autosys TM server, each line of said log file content corresponding to a one of the plurality of job scripts deployed in an instance of Autosys TM.

10. The configurable interface of claim 9, wherein each line of said log file content is identifiable by a <job name>.log title.

11. A method for enabling customized jobs deployment in Autosys TM, reviewing of deployment results of said jobs in Autosys TM, and querying said deployment results, the method comprising:
providing a verification of the deployment in a staging area, said staging area configured for arranging and deploying a plurality of job scripts in Autosys TM, wherein each job script is interrelated with one or more other job scripts;
visually indicating, in a status line, whether a first job script has been deployed in Autosys TM or is set to be deployed to Autosys TM, and further visually indicating in what way the first job script is interrelated with one or more other job scripts;
importing selected contents of a log folder from Autosys TM, said importing using an import utility, said import utility configured to import selected Job Information Language (JIL) from the Autosys TM server, each of said JIL files corresponding to one of the plurality of job scripts; and
providing the selected contents to a queryable review utility, said queryable review utility configured to confirm that one or more of the plurality of job scripts was fired in Autosys TM, wherein the queryable review utility is further configured to confirm the status of each of the job scripts vis-à-vis any of the other job scripts with which each job script is interrelated.

12. The method of claim 11, wherein the queryable review utility is further configured to confirm the status of a second job script, said second job script configured to be fired in Autosys TM only upon a completion of a first job script.

13. The method of claim 11, wherein the queryable review utility is further configured to confirm the status of a first job script, a completion of the first job script that triggers a firing of a second job script.

14. The method of claim 11, wherein the queryable review utility is further configured to confirm the status of the job script, said job script configured to be fired in Autosys TM only upon an activation of a box.

15. The method of claim 11, wherein the queryable review utility is further configured to confirm an active status of a box, a completion of the job script that triggers an activation of the box.

16. The method of claim 11, wherein, when no scheduling conditions exist (DT_COND_TX=0), then the following fields in the job are null: a STRT_MINS field, a STRT_TM field, and a STRT_DY_NM field, and when at least one scheduling condition exists (DT_COND_TX=1), then a field STRT_DY_NM is not null.

17. The method of claim 11, wherein, when no scheduling conditions exist (DT_COND_TX=0), then the following fields in the job are null: a STRT_MINS field, a STRT_TM field, and a STRT_DY_NM field, and when at least one scheduling condition exists (DT_COND_TX=1), then, either a STRT_MINS field or a STRT_TM field is active, but not both the STRT_MINS field or the STRT_TM field are active.

18. The method of claim 11, wherein one log file is created for each job script that was fired.

19. The method of claim 11, wherein the review utility is further configured to display log file content imported from an Autosys TM server, each line of said log file content corresponding to a one of the plurality of job scripts deployed in an instance of Autosys TM.

20. The method of claim 19, wherein each line of said log file content is identifiable by a <job name>.log title.

21. A method for enabling customized jobs deployment in Autosys TM, reviewing of deployment results of said jobs in Autosys TM, and querying said deployment results, the method comprising:
providing a verification of the deployment in a staging area, said staging area configured for arranging and deploying a plurality of job scripts in Autosys TM, wherein each job script is interrelated with one or more other job scripts;
visually indicating, in a status line, whether the job script has been deployed in Autosys TM or is set to be deployed to Autosys TM, and further visually indicating in what way the job script is interrelated with one or more other job scripts;
importing selected contents of a log folder from Autosys TM, said importing using an import utility; and
providing the selected contents to a queryable review utility, said queryable review utility configured:
to confirm that one or more of the plurality of job scripts was fired in Autosys TM; and
to confirm the status of each of the job scripts vis-à-vis any of the other job scripts with which each job script is interrelated;
wherein an interface is configured to load the plurality of job scripts listed therein into Autosys TM via a batch job, the batch job for deploying the jobs in Autosys TM such that the jobs are deployed to Autosys TM at greater than a predetermined accuracy rate.

22. A configurable interface for enabling customized jobs deployment in Autosys TM, the interface comprising:
a staging area for deployment of a plurality of job scripts in Autosys TM and for providing a verification of the deployment, each of said plurality of job scripts being interrelated with at least one other of the plurality of job scripts;

a status line that indicates whether the job script has been deployed in Autosys TM or is set to be deployed to Autosys TM;

an import utility configured to:
  import selected contents of a log folder from Autosys TM;
  display log file content imported from an Autosys TM server, each line of said log file content corresponding to a one of the plurality of job scripts deployed in an instance of Autosys TM; and
  import selected Job Information Language (JIL) from the Autosys TM server, each of said JIL files corresponding to one of the plurality of job scripts; and a queryable review utility, said import utility further configured to provide to the review utility the selected contents, said review utility configured to confirm that one or more of the plurality of job scripts was fired in Autosys TM, wherein the review utility is further configured to confirm the status of each of the job scripts vis-à-vis any other job scripts with which each job script is interrelated.

* * * * *